United States Patent [19]

Wyman

[11] 4,184,283
[45] Jan. 22, 1980

[54] ANTI-ESCAPE GATE FOR THE ENTRY TUNNEL OF A CRAB TRAP

[76] Inventor: Robert E. Wyman, P.O. Box 1847, Sitka, Ak. 99835

[21] Appl. No.: 870,379

[22] Filed: Jan. 18, 1978

[51] Int. Cl.² ............................................. A01K 69/08
[52] U.S. Cl. ........................................... 43/102; 43/65
[58] Field of Search ................... 43/100, 102, 105, 65, 43/66, 67

[56] References Cited

U.S. PATENT DOCUMENTS

| | | | |
|---|---|---|---|
| 1,506,045 | 8/1924 | Boyer | 43/65 |
| 1,728,645 | 9/1929 | Ward | 43/100 |
| 2,234,985 | 3/1941 | Simonds | 43/65 |
| 2,578,172 | 12/1951 | Burton | 43/65 |
| 3,184,881 | 5/1965 | Jatzeck | 43/102 |
| 3,191,338 | 6/1965 | Burgess | 43/102 |
| 3,271,894 | 9/1966 | Manno | 43/100 X |
| 4,075,779 | 2/1978 | Olafson | 43/100 |

*Primary Examiner*—Nicholas P. Godici
*Attorney, Agent, or Firm*—Christensen, O'Connor, Johnson & Kindness

[57] ABSTRACT

A comb-like gate structure having a plurality of resiliently bendable tines is affixed adjacent a constricted opening at the inner end of an inwardly convergent entry tunnel to prevent escape of crabs once they have entered the trap enclosure through such opening. The trap is of the type in which the entry tunnel is formed by netting stretched between a large entranceway in a side of the enclosure and the constricted opening formed by a rigid hoop that is disposed interiorally of the enclosure and is spaced above the bottom, and below the top, of the enclosure and is oriented so as to open generally upwardly, in facing relation to the top of the enclosure. The gate structure is attached to that segment of the hoop which secures the top portion of the tunnel netting and the tines of the gate structure are oriented to project generally horizontally across and somewhat above the opening formed by the hoop. Crabs which have entered the enclosure and have crawled up on the top portion of tunnel netting and which might otherwise escape by crawling along that portion of netting and then down into the upwardly facing, hoop-reinforced opening, are blocked from this escape route by the tines of the gate which are resiliently deflected downwardly against the segment of the hoop that forms the opposing edge of the opening, thereby closing off the opening. The tines are shaped and biased such that their free ends project inwardly and upwardly and thus away from the opposing edge of the hoop-reinforced opening, so as to permit unimpeded passage of the entering crabs which crawl up a lower portion of the tunnel netting and pass into the enclosure through the gap between the tines and the opposing edge of the opening.

6 Claims, 6 Drawing Figures

U.S. Patent  Jan. 22, 1980  Sheet 1 of 2  4,184,283
Fig. 1
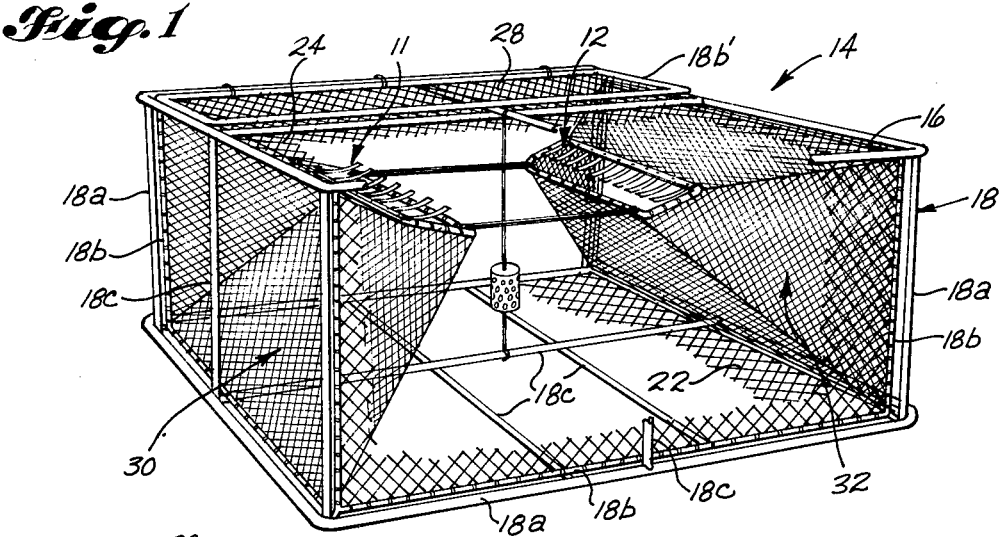
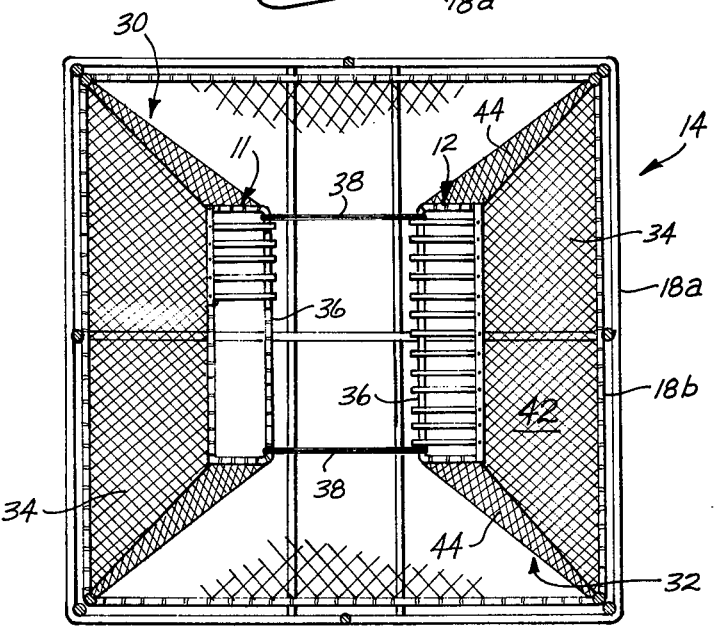
Fig. 2
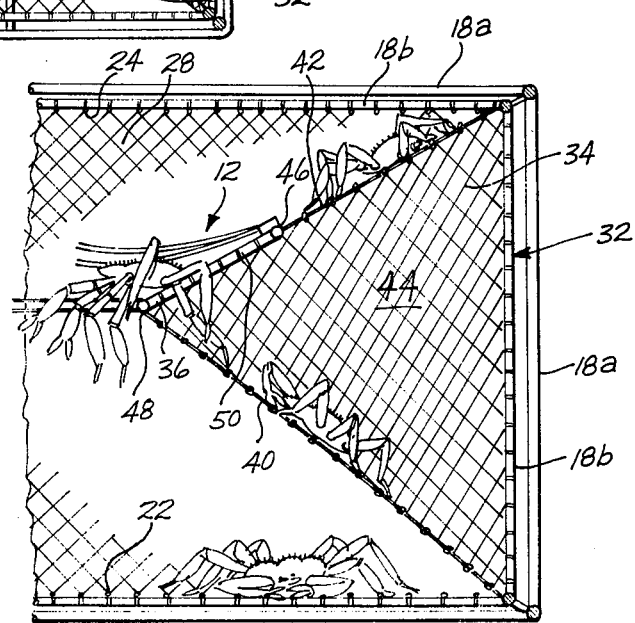
Fig. 3

ANTI-ESCAPE GATE FOR THE ENTRY TUNNEL OF A CRAB TRAP

BACKGROUND OF THE INVENTION

The invention pertains to crab traps and more particularly to the type of trap in which the entry tunnel extends inwardly from the side of the trap and terminates at an inner, constricted opening that is in spaced relation to the top, sides and bottom of the trap enclosure and that is oriented so as to open generally upwardly, in facing relation to the top of the trap enclosure.

Traps having an entry tunnel formed as above have proved more effective in holding the crabs captive, once they have entered the enclosure, than have other, prior entry tunnel configurations. By positioning the constricted opening well above the bottom of the enclosure, the bulk of the crabs are held captive because of their natural tendency to stay at or near the trap bottom. Furthermore, by orienting the constricted opening so that it faces generally upwardly toward the top of the trap, greater vertical spacing is achieved between the edge of the constricted opening at which the bottom portion of the entry tunnel terminates and over which the crabs pass as they enter the trap and thence fall to the bottom of the trap enclosure. The greater vertical spacing enables a large number of crabs to accumulate adjacent the bottom of the enclosure, before they pile up to a height that approaches the level of the constricted opening.

In constructing traps of this type, each box-like trap enclosure is usually made with two inwardly opposed entry tunnels made of netting and shaped to converge inwardly, terminating at inner, constricted openings formed by rigid, rectangular hoops to which the tunnel netting is secured. These hoops are in turn connected together by tensioning cords that draw hoops, and thus inner ends of the entry tunnels, toward each other in a mutually supporting relationship. The netting, hoops and tensioning cords are sized and connected together so that the hoops are drawn toward the center of the enclosure and thus toward each other, the plane of each hoop assumes an inclination relative to the sides of the enclosure such that the opening formed by each hoop faces upwardly toward the top of the trap enclosure.

Although more effective than other types of traps, entry tunnels having the above described configuration are not completely effective in preventing escape of trapped crabs, especially when the trap is filled to near capacity. As the trap fills up, the crabs which initially will stay near the bottom of the trap, begin to crawl onto the netting that forms the sides, top and entry tunnel of the trap. Some of these crabs crawl onto the upper surface of a top portion of the entry tunnel netting (i.e., the surface of the tunnel netting that is inside the enclosure and confronts the top of the enclosure) and thence crawl down into the hoop-reinforced opening and out through the entry tunnel.

The number of crabs which escape in this manner is believed to increase in proportion to the number of crabs held captive within the trap, presumably because the overcrowding of the crabs at the bottom of the trap tends to force ever larger numbers of them to crawl up onto the tunnel netting. The losses may be substantial, particularly when a crab trap is left in the water (referred to as a "soak") for more than the optimum of three to four days. When this happens, the number of trapped crabs may accumulate so as to reach or exceed the capacity of the trap, causing increasing numbers of crabs to escape as described above. Additionally, an excessively long "soak" may allow greater time for the crabs to explore possible escape routes, thereby increasing their chances of finding the above-mentioned escape path via the top portion of the entry tunnel netting. Despite such adverse consequences, it is frequently impossible for the crabber to meet the three to four day optimum "soak" interval because of adverse weather conditions or other unpredictable events which interfere with the crabber's schedule, and thus "soaking" is common.

In other crab trap designs, the escape path through the constricted opening of the entry tunnel is blocked off by one-way, hinged gates that allow crabs to pass into the trap but block their escape. For example, in U.S. Pat. No. 2,760,297 issued to F.E. Buyken, each entry tunnel opening is provided with a plurality of wire guards or gates which are hingedly mounted to the upper perimeter of such opening so as to depend generally downwardly therefrom and thus across the opening. These hinged gates are pushed inwardly and upwardly as the crabs enter the trap, and once in the trap, the gates swing back so as to depend downwardly across the tunnel opening, with the free ends of the gates resting on the lower perimeter of the opening, preventing any escape. While swinging gates of the type used in the trap disclosed in the above-mentioned patent, and in other prior art trap designs, are, when properly functioning, effective in blocking the escape of crabs, they have several serious disadvantages. First, the mere presence of the wire gate, obstructing the inner opening of the entry tunnel is enough to discourage some crabs from passing on into the trap. The crabs have very sensitive feelers which sense the presence of the wire gates and it is believed that at least a significant proportion of the crabs will be deterred from entering the trap because of the apparent obstruction. Secondly, hinged joints, involving relative rotation between the gate and entry tunnel structure, such as disclosed in the above-mentioned patent, are not capable of withstanding the adverse environmental conditions to which crab traps are subjected. For example, corrosion around the hinged joint frequently develops, preventing the gates from swinging freely. Also the gates may jam in either an open position or a closed position (the former rendering the gates useless and the latter preventing the crabs from entering the trap). Furthermore, when the gates and supporting structure are made of metal, the loose metal-to-metal contact at the hinge joints causes electrolysis which, in addition to being one of the causes of the above-mentioned corrosion problem, eats away at the adjacent metal thereby requiring frequent replacement of the gates and supporting structure. The electrolysis is also suspected of producing a sufficient voltage difference between the metal parts at the gated opening to cause the crabs which are sensitive to the voltage to be deterred from entering the trap.

Accordingly, it is an object of the invention to provide an improved gate for the constricted opening of entry tunnels in crab traps of the above-characterized type, in which the gate is effective to block the primary escape route in this type of trap and yet is constructed and arranged so as to permit unimpeded entry of the crabs through the constricted opening of the entry tunnel.

Another object of the invention is to provide such a gate which is durable and capable of a long life of trouble-free operation, under the adverse environmental conditions of which crab traps are subjected.

Another object of the invention is to provide such a gate which can easily retrofitted to existing crab traps having entry tunnels of the above-described type.

SUMMARY OF THE INVENTION

The anti-escape gate of the present invention is adapted for a crab trap of the type that has at least one entry tunnel formed by mesh, such as netting, and so sized and arranged so as to converge inwardly from an entranceway in a side of the trap and communicate with the interior of the trap enclosure through an inner constricted opening. The constricted opening is spaced above a bottom wall and below a top wall of the trap enclosure and is oriented so as to face generally upwardly toward a top wall of the enclosure. The entry tunnel mesh has a top portion which extends inwardly from the top of the entranceway at the side of the trap and terminates at one edge of the constricted opening and thereby forms a surface within the interior of the trap onto which trapped crabs tend to crawl and from there, escape by dropping down into the upwardly facing, constricted opening and crawling out through the entry tunnel. In a trap of this configuration, a comb-like gate is attached to the edge of the inner constricted opening that joins the top portion of the entry tunnel mesh. The gate is formed with a plurality of resiliently bendable tines which project from the edge of attachment, generally horizontally inwardly (i.e., toward the center of the trap) across the opening, and with a sufficient gap between the free ends of the tines and the opposite edge of the opening to permit unimpeded passage of the crabs into the trap.

The stiffness of the tines is selected so that when the crabs crawl out onto the tines from the upper section of the tunnel mesh (and thus over the upwardly facing opening), the tines bend under the weight of the crab or crabs and close off the opening, blocking their escape. Preferably, the tines are shaped and/or mounted so as to project horizontally inwardly and upwardly such that the free ends of the ties diverge away from the opposite edge of the opening, thus providing a larger gap through which crabs can enter the trap without being intimidated by the tines, but still providing an effective gate for blocking those trapped crabs that attempt to escape.

To provide a complete disclosure of the invention, reference is made to the appended drawings and following description of one particular and preferred embodiment.

BRIEF DESCRIPTION OF THE DRAWINGS

FIG. 1 is a perspective view, partly cut away for clarity, showing a crab trap of the type having entry tunnels as above characterized in which the inner, constricted opening of each of the tunnels is provided with the comb-like gate of the invention.

FIG. 2 is a plan view of the trap shown in FIG. 1 with the top of the trap cut away for clarity.

FIG. 3 is a partial, side elevational view of the trap of FIG. 1 with the near side wall cut away for clarity.

DETAILED DESCRIPTION

Figure 4:
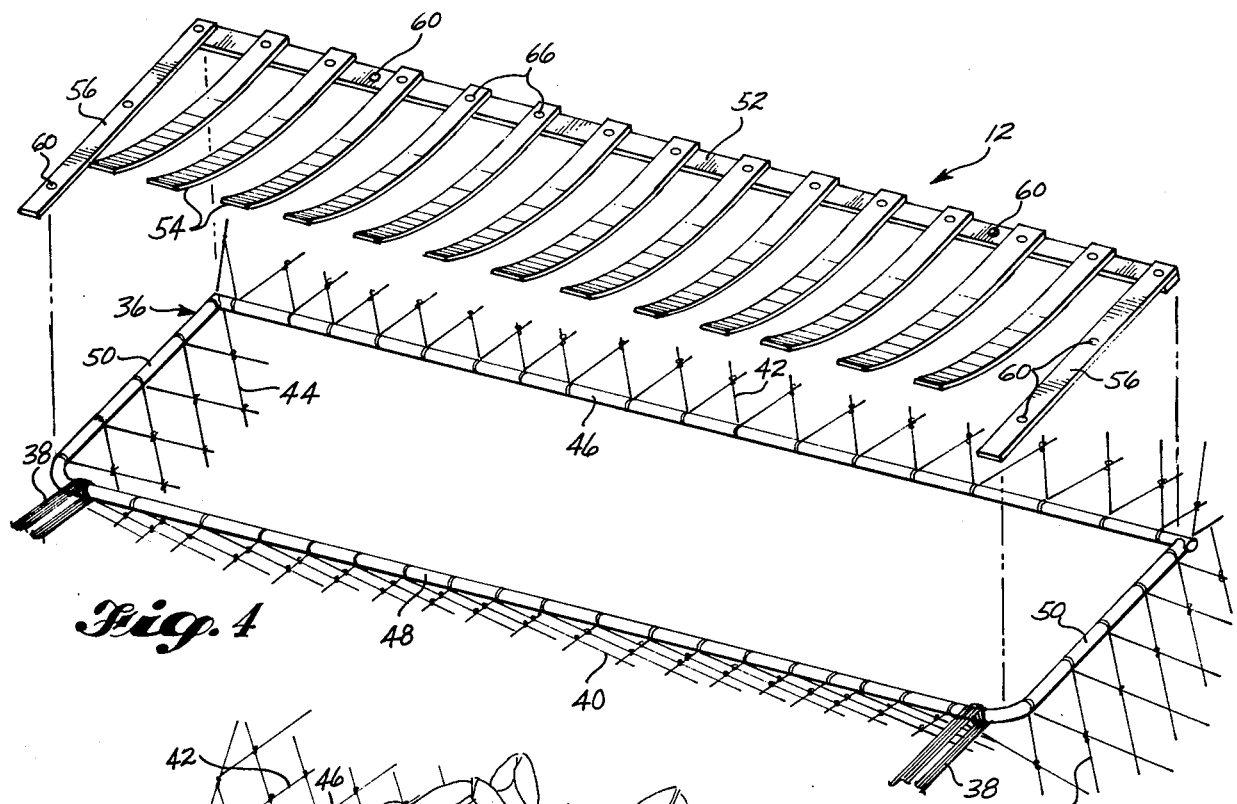
FIG. 4 is an enlarged exploded view of the comb-like gate and constricted opening of the entry tunnel.

With reference to FIG. 1, a pair of anti-escape gates 11 and 12 are shown mounted at the inner, constricted tunnel openings of a conventional, two-tunnel crab trap 14. The interior of the trap is formed by an enclosure 16 in the shape of a flattened cube, and includes a mesh, such as netting, secured to a framework 18 made of metal reinforcing bars welded together in the desired shape. In particular, framework 18 includes an outer frame 18a of relatively heavy gauge reinforcing bars and a conforming, slightly smaller, inner frame 18b made of lesser gauge reinforcing bars. Inner frame 18b is permanently attached to the outer frame 18a at the corners of the structure, and each of the horizontal and vertical bars that form frame 18b are spaced slightly inwardly from the corresponding bars of outer frame 18a such that the netting can be attached to the inner framework 18b, with the points of attachment of the netting to the bars being protected by outer framework 18a. Framework 18 may be reinforced by intermediate, horizontal and vertical bars 18c, and the inner frame 18b at one side of the enclosure is formed with an upwardly swingable door 18b' for emptying the crabs from the trap. Netting is stretched across the horizontal and vertically oriented rectangular sections of frame 18b to form a bottom panel 22, a top panel 24, a near side panel 26, and a door panel 28. Door panel 28 is attached to door frame 18b' which, in turn, is hinged to frame 18a about its upper horizontal edge at the far side of enclosure 16 so that it can be swung upwardly and outwardly and folded back on to the top of the trap (as it is shown in FIG. 1), for opening the interior of the trap and emptying its contents.

Inwardly opposed entry tunnels 30 and 32 are arranged at the remaining pair of opposed sides of the enclosure 16 and the associated rectangular sections of inner frame 18b at these sides are open so as to form the entranceways into tunnels 30 and 32. With reference to FIG. 2, tunnels 30 and 32 are made by forming irregularly shaped, tubular sections of tunnel netting 34, each of which has an enlarged end opening that is congruently attached to the perimeter of the rectangular, vertically oriented section of inner frame 18b at the associated side of the enclosure, and each of the which has a smaller opening at the opposite end that is congruently secured to the perimeter of a rigid, horizontally elongated, rectangular hoop 36 (see FIG. 4). Hoops 36 are formed of metal reinforcing bars of generally the same gauge as inner frame 18b. Opposite ends of a pair of tensioning cords 28 are affixed to the elongate segments of hoops 36 which secure the bottom portions 40 of netting 34 (see FIG. 3) and are pulled taut, causing hoops 36 and the inner openings of netting 34 to be drawn toward the center of the enclosure. The bottom and top portions 40 and 42 of tunnel netting 34 (see FIG. 3) are sized so that when cords 38 are pulled taut, the bottom portion 40 and the top portion 42 of netting 34 are stretched taut and caused to assume an inwardly convergent V shape (as viewed in FIG. 3) in which the lower leg of the V is formed by bottom portion 40 of the tunnel netting and the upper leg of the V is formed by the top portion 42 of the tunnel netting together with hoop 36. Furthermore, the plane of hoop 36 assumes an inclined orientation that is a continuation of the downwardly and inwardly sloping orientation of netting portion 42, which positions the opening formed by hoop 36, in an upwardly facing relationship with top panel 24 of enclosure 16.

With reference to FIG. 3, the major and minor dimensions of hoops 36 are selected to be substantially less than the corresponding major and minor dimensions of the entranceway opening formed by frame 18b at the side of enclosure 16 such that netting 34 is inwardly convergent from the outer entranceway to the inner, constricted opening formed at hoop 36. The minor dimension of hoop 36, that is the dimension between the relatively long segments 46 and 48 of the hoop, is selected to enable the crabs to pass sidewise through the constricted opening, after crawling up the inwardly and upwardly sloping floor of the tunnel formed by the bottom portion 40 of netting 34. The major dimension of hoop 36, between the relatively short side segments 50 of the hoop, is similarly less than the corresponding major dimension of the entranceway at frame 8b, such that the side portions 44 of netting 34 are likewise inwardly convergent to points of termination along hoop segments 50.

Figure 5:
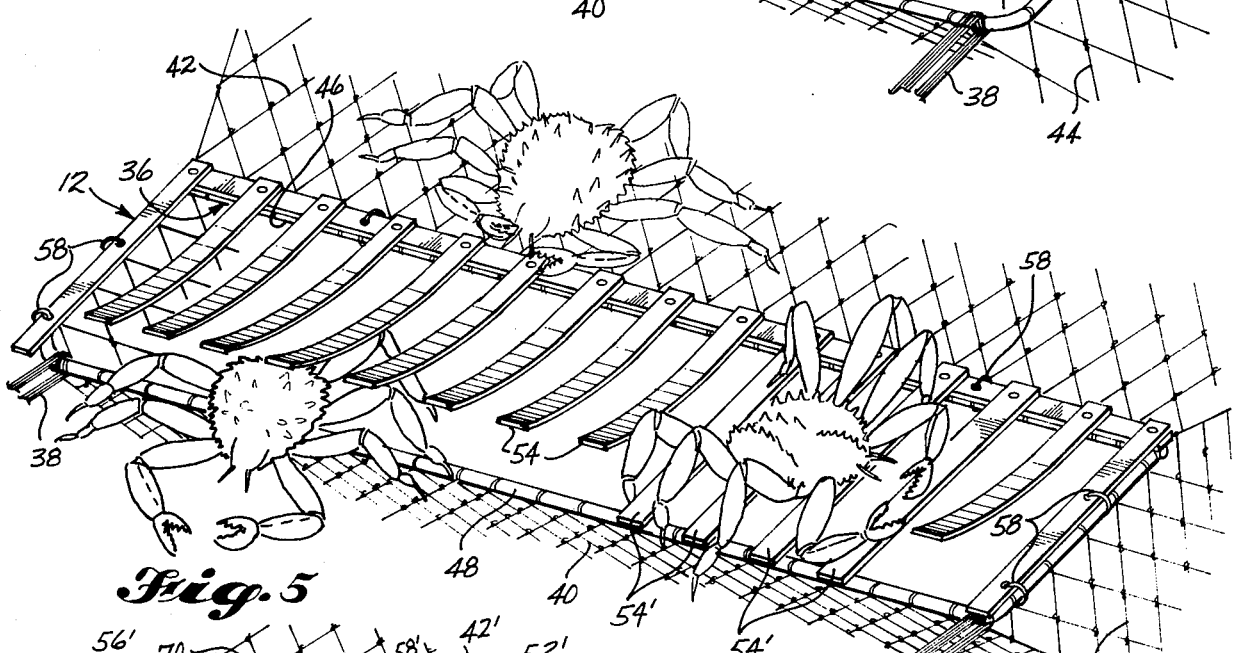
FIG. 5 is a detailed view of the gate of the invention as mounted at the constricted opening of the entry tunnel and illustrating how the gate functions to block crabs that attempt to escape via the top portion of the entry tunnel netting while permitting unimpeded entry of the crabs into the trap through a gap between the tines of the gate and an opposite edge of the opening.

Gates 11 and 12 are of identical construction and thus only one will be described in detail. As shown in FIGS. 4 and 5, gate 12 is of a comb-like construction and includes an elongate tie bar 52 and a plurality of resiliently bendable tines 54 projecting outwardly from one side of bar 52. A pair of straight tines 56, one mounted at opposite ends of bar 52 are sized and arranged with bar 52 so that gate 12 can be laid onto hoop 36 and fastened thereto with bar 52 and tines 56 being substantially congruent with hoop segments 46 and 50, respectively, as shown in FIG. 5. Straps 58 secure gate 12 to the hoop at suitable intervals along segments 46 and 50, wherein strap receiving holes 60 are provided at spaced intervals along bar 52 and tines 56.

Gate 12 is sized such that when assembled on hoop 36 with bar 52 fastened to hoop segment 46, and thus attached at the edge of the constricted opening that joins top portion 42 of the tunnel netting, tines 54 are oriented to project generally horizontally away from hoop segment 46 and toward the center of the enclosure. The length of tines 54 is selected so that they span the minor dimension of hoop 36 between segment 46 and the opposite edge forming segment 48, such that when deflected downwardly by the weight of the crab, the free ends of tines 54 are pressed against hoop segment 48 as shown by tines 54' in FIG. 5.

One of the important features of the invention is to so arrange tines 54 of gate 12 so that a substantial gap normally exists between the free ends of tines 54 and the segment 48 of hoop 36 that is attached to the bottom portion 40 of the tunnel netting so that the crabs are not intimldated and thereby discouraged from entering the trap by any apparent obstruction at the gated opening. This objective may be accomplished by using straight tines, and orienting them so that they project at a diverging angle away from the plane of hoop 36, but more preferably it is achieved by forming tines 54 with an inwardly and upwardly curved shape as illustrated in the drawings. When not deformed by the weight of the crabs, the curvature provided in tines 54 causes their free ends to diverge away from hoop segment 48 and the edge of the constricted opening formed thereby, thus creating a greater gap between tines 54 and segment 48 which has been found sufficient to allow the crabs to crawl sideways through the gap without sensing or otherwise encountering the apparent obstacle of tines 54.

It is observed that the resilient flexiblity of tines 54 enable the tines to give when forced downwardly as described above and shown by tines 54', and upwardly, if pushed in that direction by an entering crab. However, it is believed that even though crabs are capable of forcing entry through a gate formed by movable tines or the like, they are intimidated by apparent obstacles and will not always force their way past a movable gate. Thus it is considered preferable to eliminate the presence of apparent obstacles at the opening to the trap. The construction and arrangement of gate 12 advantageously meets this objective.

The material from which the gate 12 is made constitutes an important, critical aspect of the invention. While it might be thought that any one of a number of commonly available materials could be used for gate 12, it has been found that plastic (thermoplastic or thermosetting polymers) is the only kind of material which is capable of functioning as desired, when made into a gate structure according to the invention and when subjected to the harsh environment of low temperatures and the corrosive effects of salt water. Furthermore, plastic substances do not give rise to electrolytically generated voltages within the structural components of the trap that is believed to sometimes deter crabs from entering the trap. For this purpose, the entire gate 12, including bar 52, tines 54 and 56 and straps 58, is made of plastic substance selected to provide the necessary durability and resiliency that will ensure proper functioning of tines 54. In the embodiment shown in FIGS. 1-5, a thermal memory plastic (a thermoplastic polymer), the characterstics and availability of which are well known (for example, a suitable thermal memory plastic is available from Stokes Molded Products of Trenton, NJ), is employed for tines 54 and is used to form tines 54 with the permanent curvature referred to above. In particular, the thermal memory plastic tines 54 are heated to a critical temperature, specified by the manufacturer of the material, and then the tines are formed in the desired curved shape. Thereafter the tines are cooled to room temperature.

The gate may be molded or otherwise formed as an integral unit, or as in the present embodiment, made by cutting a continuous length of stock plastic strip material into a plurality of shorter sections that make up tines 54 and 56 and by using a heavier gauge stock for bar 52. These cut strips are then bonded together as indicated at 66 in FIG. 4, such as by using one of various known heat bonding operations. Alternatively, of course, adhesive binders may be used to secure tines 54 and 56 to bar 52.

The precise length, width and spacing of tines 54 is not believed to be critical, however, by way of example the following dimensions have been used for an opening having a length of 36 inches (major dimension) and a width of 10 inches (minor dimension). Thirteen tines were used (not counting the strapped down tines 56) each having a width of one inch and a length of 11 inches and mounted on tie bar 52 at spacing 2½ inch intervals, center to center.

Figure 6:
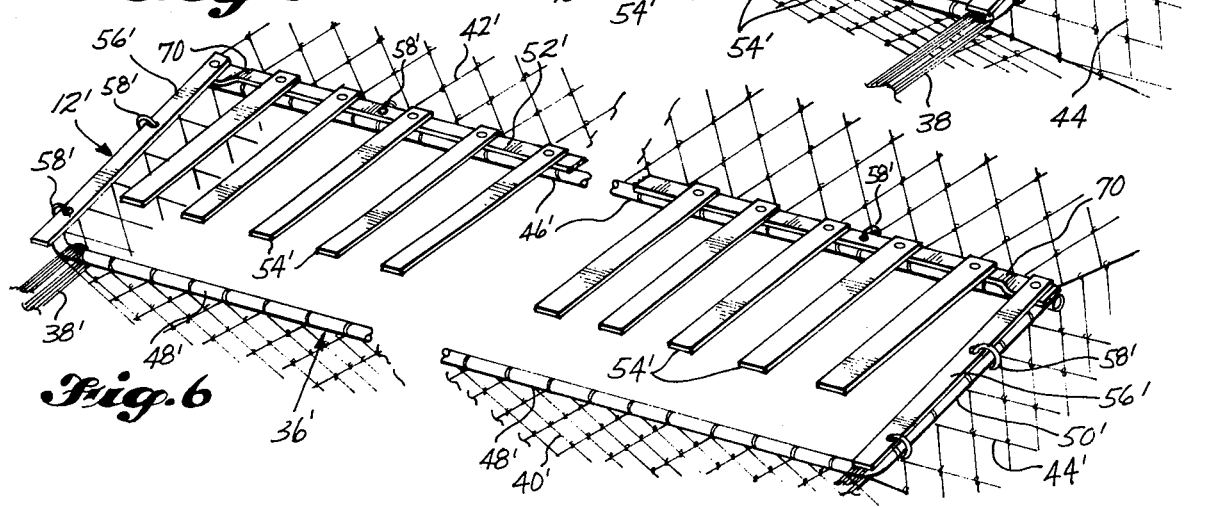
FIG. 6 is a fragmentary view of an alternative construction of the comb-like gate.

In FIG. 6 an alternative construction of the gate is illustrated, in which corresponding reference numbers, with a prime notation, are used to identify like parts that have been described above in connection with FIGS. 1-5. The gate 12' is attached to a hoop 36' as in the previously described embodiment. In fabricating gate 12', bar 52' is formed with twists 70 adjacent opposite ends so as to cause the plurality of tines 54' (which may be straight in this embodiment) to diverge away from the plane of the hoop. The severity of the twists 70, and thus the amount of divergence of tines 54' may, for example, vary to provide a selected angle of divergence of from approximately 20° to 50° depending upon the size of the crabs that are to be trapped. It has been found that the embodiment of FIG. 6 is preferred where the traps equipped with the gates of the invention are stored in a place exposed to hot sunlight which heats the plastic material and causes the tines (e.g., twists 54 of the above embodiment) to lose their curved shape. In gate 12', the twists 54' may be straight and are oriented by the twists 70 in bar 52' to form the desired gap with hoop segment 48'.

OPERATION

Preferably gates 11 and 12 are manufactured as subassemblies as described above and as shown by gate 12 in FIG. 4 (or gate 12' in FIG. 6), and are thereafter mounted onto new or previously used traps. One of the advantages of gates 11 and 12 is that they may be used on existing traps, without requiring any structural modifications of the entry tunnel openings. Each gate is simply strapped to the hoop 36 that forms the inner, constricted opening.

After the gates have been installed on the trap opening, and the traps have been placed in the water, the gates function as follows (FIG. 3). Crabs enter the trap by crawling up the tunnel floor formed by bottom portion 40 of tunnel netting 34, and by passing between tines 54 and hoop segment 48, whereupon the crabs drop to the bottom of enclosure 16. When enclosure 16 (FIG. 1) of the trap nears capacity, there is a tendency for the crabs to crawl up onto the upper surface of the top portion 42 of the tunnel netting (FIGS. 2 and 3). As best shown in FIGS. 3 and 5, trapped crabs which have crawled onto portion 42, and might escape through the upwardly facing opening formed by hoop 36, are blocked from this escape route by tines 54. As the crab or crabs crawl from netting portion 42 out onto the generally horizontally projecting tines 54, the tines bend under the weight of the crab, as discussed above, and block the opening. As a result, the crab will continue crawling off the ends of tines 54' (FIG. 4) and drop back toward the bottom of enclosure 16.

While only particular embodiments of the invention have been disclosed herein, it will be readily apparent to persons skilled in the art that numerous changes, modifications and substitutions of equivalent components and means may be made thereto without departing from the spirit of the invention. For example, depending upon the crabbing area and local fishing regulations, it is sometimes necessary to block off a certain percentage of the width of the constricted opening so as to allow crabs of only a certain size, and thus species, to enter trap. This is usually accomplished by attaching bar lengthwise across the major dimension of the hoop that forms the constricted opening so that only crabs that can squeeze between the added bar and one edge of the hoop can gain entry into the trap. Such a size restrictive bar may also be provided in conjunction with each of gates 11 and 12 by mounting the bar lengthwise of the hoop, as usual, beneath the horizontally projecting tines. Tines 54 will function as described above, only in this case in conjunction with a constricted opening of a lesser width.

The invention in which an exclusive property or privilege is claimed is defined as follows:

1. In a crab trap of the type having bottom, top and side walls enclosing a crab trapping interior and having at least a first entry tunnel formed by a mesh that extends inwardly from an outer entranceway opening in a side wall and terminates at an inner opening which is spaced above the bottom wall and below the top wall and which is oriented to generally face upwardly toward the top wall, and wherein a top portion of the entry tunnel mesh extends from said outer entranceway opening in spaced relation beneath the top wall and terminates at a first edge of the inner opening and has an upper surface within the interior of the trap which crabs tend to crawl onto, wherein the improvement comprises:

a comb-like gate structure made of a plastic substance and attached to said first edge of said inner opening and having a plurality of resiliently bendable tines, the ends of which tines project away from said first edge into the interior of the trap and are so spaced in relation to a second edge of said inner opening opposite said first edge such that crabs enter the trap by passing between said second edge of said inner opening and said tines, and drop to the bottom wall of the trap, and such that trapped crabs which have crawled up onto the upper surface of the entry tunnel mesh are prevented from escaping back out through said inner opening by said tines which resiliently bend under the weight of the crabs and force the free ends of the tines downwardly against said second edge of the inner opening shutting off the opening to escape.

2. The improvement set forth in claim 1 wherein said entry tunnel of said trap is formed by a substantially rigid, generally rectangular hoop that is secured to said entry tunnel mesh at said inner opening, and wherein said gate structure comprises a tie bar to which said plurality of tines are supportively attached, and wherein said tie bar is secured to a segment of said hoop that forms said first edge of said inner opening.

3. The improvement of claim 1 wherein said trap has a second entry tunnel formed by a mesh sized and arranged so as to be substantially identical to said first entry tunnel but oriented inwardly opposing relationship thereto, the inner opening of said first and second entry tunnels each being formed by a substantially rigid, generally rectangular hoop that is elongated in one dimension with the relatively longer rim segments of each hoop being arranged parallel to said bottom and top walls of said trap, and further including tensioning cords interconnecting said hoops so as to draw said hoops toward each other and thus toward the center of the trap to cause said hoops and the associated entry tunnels to assume a mutually supporting relationship in which the inner openings of said first and second entry tunnels are spaced above the bottom wall and below the top wall and in which the planes of said hoops are oppositely inclined relative to said bottom and top wall such that the inner openings formed by said hoops are oriented to face generally inwardly and upwardly toward the top wall of said trap, and wherein top portions of the entry tunnel mesh of said first and second entry tunnels are attached to a first rim segment of the hoop, that provides said first edge of the inner opening of said first tunnel and to a first rim segment of the hoop that forms a corresponding first edge of said second tunnel, respectively, and further comprising an additional comb-like gate structure, identical to the first named gate structure and being attached and arranged with respect to the first edge of the inner opening of said second entry tunnel in the same orientation as defined by the attachement of the first said gate structure to the inner opening of said first entry tunnel, and each of said comb-like gate structures comprising a tie bar to which said tines are supportively attached, and said tie bar of the first said gate structure being attached to said first rim segment of the hoop that forms the inner opening of said first entry tunnel, and said tie bar of said additional gate structure being attached to the first segment of the hoop that forms the inner opening of said second entry tunnel.

4. The improvment of claim 1 wherein said plurality of tines are shaped and mounted to project inwardly and upwardly so as to diverge away from said second edge of said inner opening.

5. The improvement of claim 1 wherein said inner opening has a plane that is inclined inwardly and downwardly with respect to the interior of said trap so that said inner opening faces both generally upwardly toward said top wall and inwardly toward the center of the trap interior and wherein said first edge of said inner opening is closest to said top wall and said second edge of said inner opening is closest to said bottom wall, and wherein the free ends of said tines of said gate structure are oriented so that they project inwardly toward the center of the trap interior and upwardly toward said top wall, and thus diverge away from said second edge.

6. The improvement of claim 2 wherein the plane of said hoop is inclined inwardly and downwardly with respect to the interior of said trap so that said inner opening formed by said hoop faces both generally upwardly toward said top wall and inwardly toward the center of the trap interior and wherein said first edge of said inner opening is closest to said top wall and said second edge of said inner opening is closest to said bottom wall, and wherein the free ends of said tines of said gate structure are curved so that they project inwardly toward the center of the trap interior and upwardly toward said top wall, and thus diverge away form said second edge.

* * * * *